United States Patent
Wang (10) Patent No.: US 7,903,726 B2
(45) Date of Patent: Mar. 8, 2011

(54) SIGNAL RECEIVING APPARATUS AND SIGNAL POWER PREDICTION METHOD THEREOF

(75) Inventor: Houk Wang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 775 days.

(21) Appl. No.: 11/850,880

(22) Filed: Sep. 6, 2007

(65) Prior Publication Data

US 2008/0101449 A1    May 1, 2008

(30) Foreign Application Priority Data

Nov. 1, 2006   (KR) .................. 10-2006-0107482

(51) Int. Cl.
*H04B 3/46*   (2006.01)
*H04B 17/00*  (2006.01)
*H04Q 1/20*   (2006.01)

(52) U.S. Cl. ......... 375/228; 375/227; 375/284; 375/285; 375/346; 455/226.1; 455/226.2; 455/226.3; 455/226.4; 455/67.13

(58) Field of Classification Search ............ 455/572, 455/69, 231, 343.2, 226.1–226.4, 67.13; 375/228, 227, 284, 285, 346
See application file for complete search history.

(56) References Cited

U.S. PATENT DOCUMENTS

| | | | | |
|---|---|---|---|---|
| 5,953,646 | A * | 9/1999 | Hirasawa | 455/343.2 |
| 7,050,773 | B2 * | 5/2006 | Bi | 455/226.1 |
| 2001/0044286 | A1 * | 11/2001 | Watanabe | 455/231 |
| 2005/0208899 | A1 * | 9/2005 | Hanabusa | 455/69 |
| 2007/0110006 | A1 * | 5/2007 | DiFazio | 370/337 |
| 2007/0191073 | A1 * | 8/2007 | May et al. | 455/572 |

FOREIGN PATENT DOCUMENTS

| | | |
|---|---|---|
| JP | 2004-129231 | 4/2004 |
| KR | 2003-43730 | 6/2003 |
| KR | 2006-5046 | 1/2006 |

* cited by examiner

*Primary Examiner* — Phuong Phu
(74) *Attorney, Agent, or Firm* — Stanzione & Kim, LLP (57) ABSTRACT

A signal receiving apparatus includes an indicating unit, a receiving, a system unit which comprises a plurality of electronic components to provide signal processing, a storing unit to store information related to a noise level, and a controlling unit to estimate a signal power level of the data received by the receiving unit, to compare the estimated signal power level of the data with the noise level generated by a power supply to the system unit, and to control the indicating unit to indicate whether the data can be received.

11 Claims, 7 Drawing Sheets

| CHANNEL | 8A | 8B | 8C | 12A | 12B | 12C |
|---|---|---|---|---|---|---|
| COMPENSATED RECEIVING ALLOWABLE LEVEL | −5 | −10 | −11 | +4 | +9 | +11 |
| LED | ● | ● | ● | ○ | ○ | ○ |
| DOT-MATRIX LCD |  |  |  |  |  |  |

FIG. 5

SIGNAL RECEIVING APPARATUS AND SIGNAL POWER PREDICTION METHOD THEREOF

CROSS-REFERENCE TO RELATED APPLICATIONS

This application claims priority under 35 U.S.C. §119(a) from Korean Patent Application No. 2006-0107482, filed on Nov. 1, 2006 in the Korean Intellectual Property Office, the disclosure of which is incorporated herein in its entirety by reference.

BACKGROUND OF THE INVENTION

1. Field of the Invention

Apparatuses and methods consistent with the present general inventive concept relate to a signal receiving apparatus and a signal power prediction method thereof, and more particularly to a signal receiving apparatus and a signal power prediction method thereof, which indicates whether data can be received.

2. Description of the Related Art

A signal receiving apparatus receives data from the outside, processes the received data, and displays it to a user. The signal receiving apparatus may receive various types of data according to frequency bands. Each data has a different power level according to the type of signal, and the signal receiving apparatus can receive the data if the power level is higher than a predetermined level.

A conventional signal receiving apparatus indicates the signal power level of the received data, enabling the user to be informed whether the signal can be received at the present location. However, as the signal receiving apparatus, such as a cellular phone, a personal digital assistant (PDA) and others known in the art, is usually turned on at a time when it is needed to be used, it is hard to know whether the data can be received in a state in which a power is off.

Therefore, even if the power of the signal receiving apparatus is off, the signal receiving apparatus supplies the power to only a certain module, which receives the data, so that it can inform the user whether the data can be received. That is, the signal receiving apparatus indicates whether the data can be received through an indicating unit such as a light emitting diode (LED), a liquid crystal display (LCD), and others known in the art.

However, if the user turns on the signal receiving apparatus on the basis of the indicating unit which indicates whether the signal can be received, the data may not be received due to a noise which is generated by the power supplied to the entire signal receiving apparatus.

Especially, the signal power level of the data of a terrestrial Digital Multimedia Broadcasting (DMB) which uses a frequency band of 200 MHz, has a deviation of 20 dB to 30 dB according to a noise level. This may cause an incorrect indication as to whether the data can be received considering that even a difference of 2 to 3 dB may have an influence in the terrestrial DMB on whether the data can be received.

That is, if the noise level generated by the supply of power is higher than a maximum allowable noise level which can allow the data to be normally received, the signal receiving apparatus may not receive the data. Accordingly, if the power is not yet supplied to the entire signal receiving apparatus, the signal receiving apparatus may incorrectly indicate as to whether the data can be received.

SUMMARY OF THE INVENTION

The present general inventive concept provides a signal receiving apparatus and a signal power prediction method thereof where information about a level of noise, which is generated if a power is supplied to the signal receiving apparatus, is stored and compared with a signal power level of received data, so that correct information about whether the data can be received can be provided to a user.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a signal receiving apparatus comprising an indicating unit, a receiving unit to receive data, a system unit which comprises a plurality of electronic components to provide signal processing, a storing unit to store information related to a noise level, and a controlling unit to estimate a signal power level of the data received by the receiving unit, to compare the estimated signal power level of the data with the noise level generated by a power supply to the system unit, and to control the indicating unit to indicate whether the data can be received.

The information related to the noise level is discriminated by at least one of the receiving unit and a state of power supplied to the system unit.

The signal receiving apparatus further comprises a user interface (UI) generating unit to generate a UI image about whether the data can be received, wherein the controlling unit indicates through the UI image whether the data can be received.

The controlling unit controls the UI generating unit to generate the UI image which indicates the signal power level required to receive the data, if the data cannot be received.

The controlling unit indicates whether the data can be received by reflecting a carrier to noise (C/N) level on the noise level.

The signal receiving apparatus further comprises a user inputting unit, wherein the controlling unit receives a selection of the information related to the noise level through the user inputting unit, and indicates whether the data can be received according to the selected information.

The received data is a digital multimedia broadcasting (DMB) signal.

The foregoing and/or other aspects and utilities of the present general inventive concept can also be achieved by providing a signal power prediction method of a signal receiving apparatus comprising a system unit which includes a plurality of electronic components to provide signal processing, the signal power prediction method comprising storing information related to a noise level which is generated by a power supply to the system unit, receiving data from an outside, estimating a signal power level of the received data, comparing the estimated signal power level of the data with the noise level which is generated by the power supply and determining and indicating whether the data can be received according to a result of the comparing operation.

The information related to the noise level is discriminated by at least one of a receiving unit which receives the data and a state of the power supplied to the system unit.

The indicating whether the data can be received comprises indicating a signal power level required to receive the data, if the data cannot be received.

The indicating whether the data can be received comprises indicating whether the data can be received by reflecting a carrier to noise (C/N) level on the noise level.

The received data comprises a digital multimedia broadcasting (DMB) signal.

The foregoing and/or other aspects and utilities of the present general inventive concept can also be achieved by providing a signal receiving apparatus usable with a power supplying unit, the apparatus comprising a receiving unit to receive data, and a controlling unit to estimate a signal power level of the received data and to compare the estimated signal power level of the received data with a noise level generated by the power supplying unit.

The foregoing and/or other aspects and utilities of the present general inventive concept can also be achieved by providing a method of operating a signal receiving apparatus, the method comprising receiving data, estimating a signal power level of the received data and comparing the estimated signal power level with a noise level generated by a power supplying unit.

The foregoing and/or other aspects and utilities of the present general inventive concept can also be achieved by providing a method of operating a signal receiving apparatus, the method comprising identifying a signal power level of data, determining whether the power signal level is lower than a receiving sensitivity of a signal receiving apparatus; and indicating that the data can not be received by the signal receiving apparatus if the determining operation determines that the signal power level is lower than the receiving sensitivity.

The foregoing and/or other aspects and utilities of the present general inventive concept can also be achieved by providing a signal receiving system, the system comprising a power supplying unit to supply power, and a signal receiving apparatus to receive data, to estimate a signal power level of the received data and to compare the estimated signal power level of the received data with a noise level generated by the power supplying unit.

The foregoing and/or other aspects and utilities of the present general inventive concept can also be achieved by providing a computer-readable medium containing having embodied thereon a computer program to execute a method, wherein the method comprises a receiving unit to receive data, and a controlling unit to estimate a signal power level of the data and to compare the estimated signal power level of the data with a noise level generated by the power supplying unit.

BRIEF DESCRIPTION OF THE DRAWINGS

The above and/or other aspects of the present general inventive concept will become apparent and more readily appreciated from the following description of the exemplary embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Figure 1A:
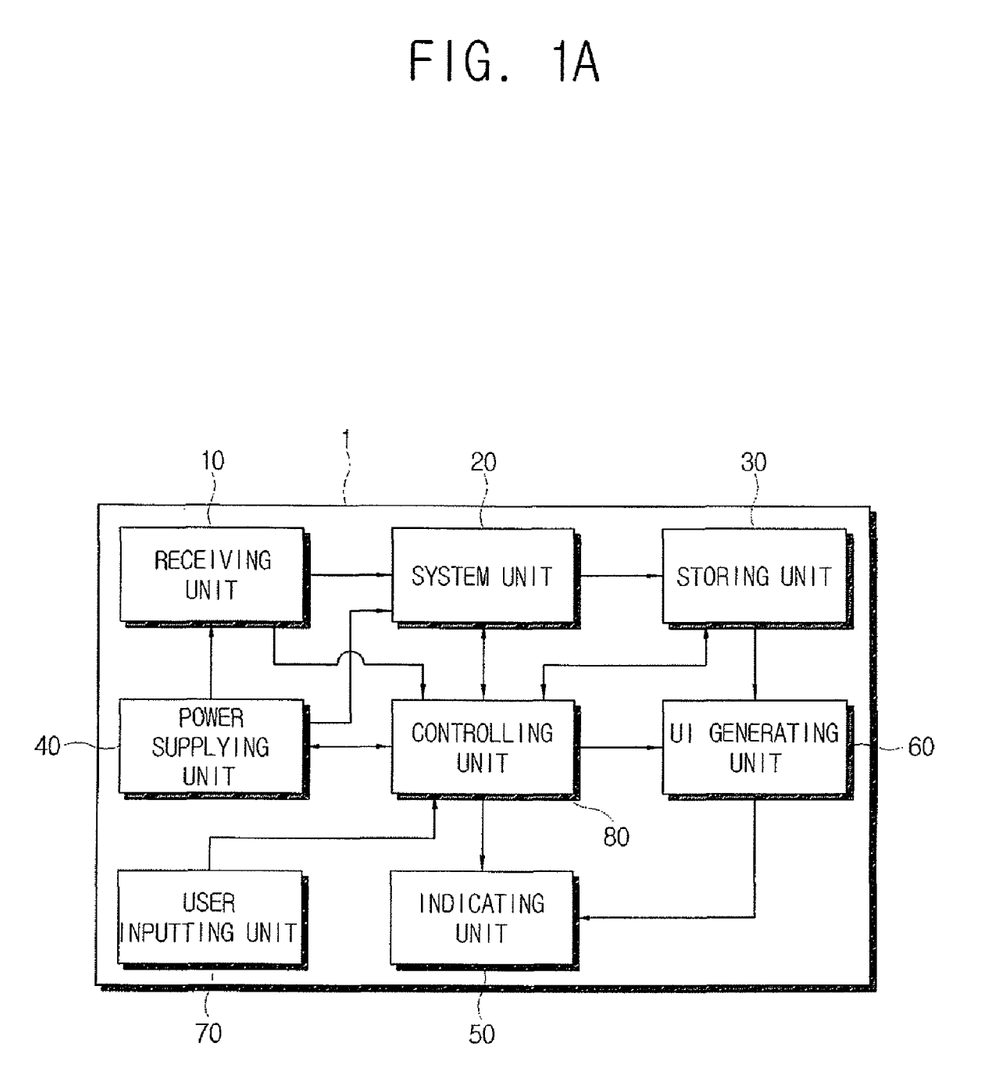
FIG. 1A and FIG. 1B are block diagrams illustrating a structure of a signal receiving apparatus according to an embodiment the present general inventive concept.
Figure 1B:
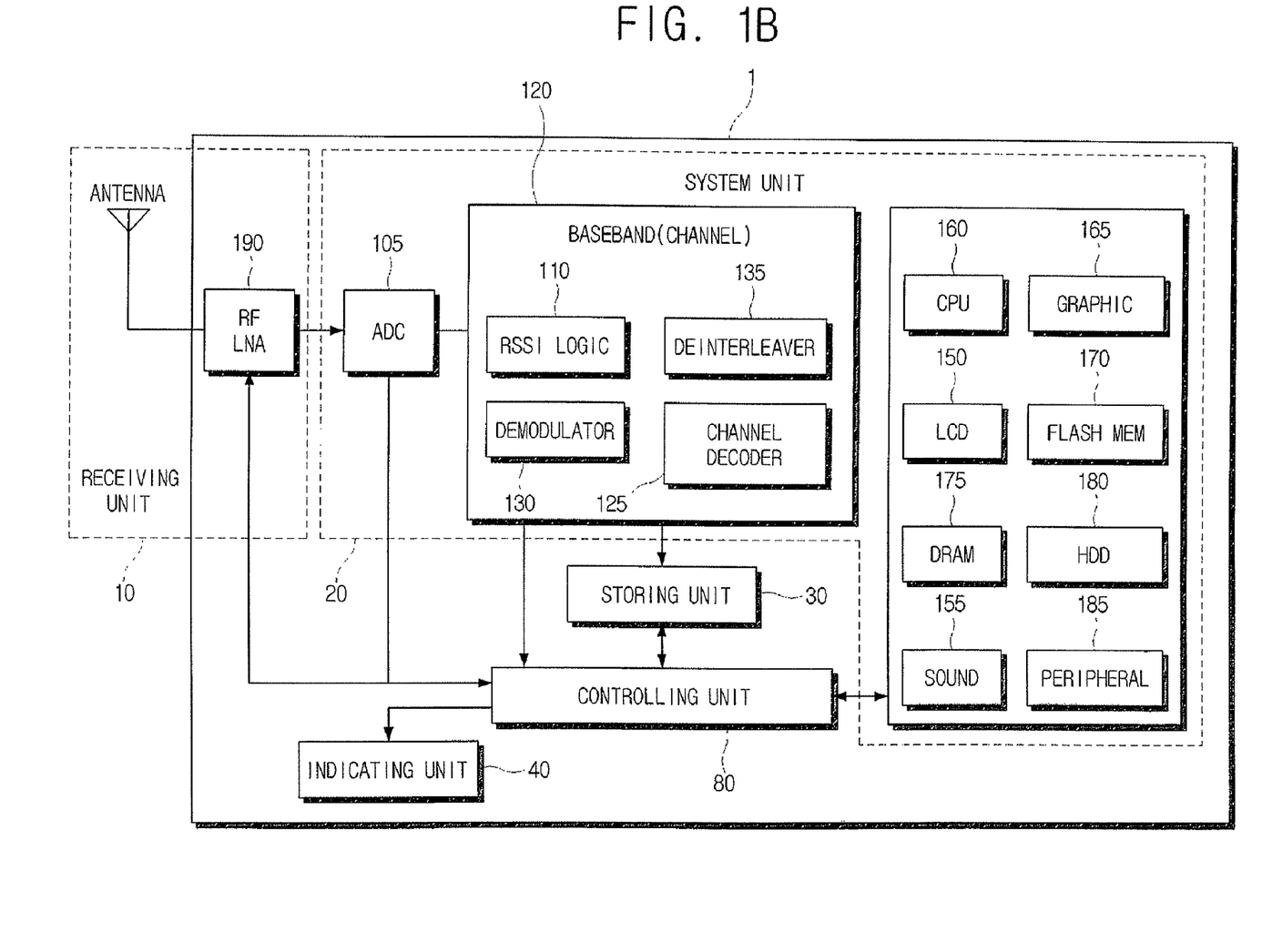

FIG. 1A and FIG. 1B are block diagrams illustrating a structure of a signal receiving apparatus 1 according to an embodiment of the present general inventive concept. Referring to FIG. 1A, the signal receiving apparatus 1 according to an exemplary embodiment of the present general inventive concept includes a receiving unit 10, a system unit 20, a storing unit 30, a power supplying unit 40, an indicating unit 50, a user interface (UI) generating unit 60, a user inputting unit 70, and a controlling unit 80. The signal receiving apparatus 1 according to the present general inventive concept can be, but is not necessarily embodied by a Digital Multimedia Broadcasting (DMB) receiving apparatus, a notebook computer, etc.

The receiving unit 10 receives data from the outside. The receiving unit 10 according to the present embodiment can be, but is not necessarily embodied by an antenna and a tuner, and may include a low noise amplifier (LNA) 190, which amplifies a gain value of a received signal.

The system unit 20 includes a plurality of electronic components and processes the data received by the receiving unit 10. The system unit 20 according to an exemplary embodiment of the present general inventive concept, as illustrated in FIG. 1B, includes an Analog to Digital Converter (ADC) 105 which converts an analog type signal of data received by the receiving unit 10 into a digital signal, and a baseband 120. The baseband 120 may include a deinterleaver 135, a demodulator 130, and a channel decoder 125, and can perform signal demodulation, channel decoding, etc. The system unit 20 may also include a Received Signal Strength Indicator (RSSI) logic 110 which determines signal power of the received data. Although the RSSI logic 110 is described to be included in the system unit 20 in FIG. 1B, the RSSI logic 110 may be included, not in the system unit 20, but in the receiving unit 10.

The storing unit 30 stores information related to a noise level according to an operating state of the system unit 20. The information related to the noise level is discriminated by the operating state of the system unit 20 according to the receiving unit 10, a state of power supplied to the system unit 20, etc. For example, the information related to the noise level is discriminated according to whether the receiving unit 10 is an external antenna or an internal antenna and according to whether a current state of a battery is charge/discharge/buffer. Alternatively, the noise level information may include all information where the noise level varies according to power supply to the system unit 20. The storing unit 30 can be, but is not necessarily embodied by a flash memory.

The power supplying unit 40 supplies power to the receiving unit 10 and the system unit 20. The power supplying unit 40 according to an exemplary embodiment of the present general inventive concept is capable of supplying the power to a certain module, which includes the receiving unit 10, so that the signal power level of the data can be estimated by control of the controlling unit 80 to be described below.

The indicating unit 50 indicates whether the data can be received. Accordingly, whether the data can be received is determined by the controlling unit 80. The indicating unit 50 according to the present general inventive concept can be, but is not necessarily embodied by a light emitting diode (LED), a liquid crystal display (LCD), etc.

However, though the indicating unit 50 according to an exemplary embodiment of the present general inventive concept uses a visual image, it may use sound so that it can auditorily inform the user of whether the data can be received.

The user interface (UI) generating unit 60 generates a UI image about whether the data can be received. Accordingly, if the data is not received, the UI image can include a UI image which indicates the level of the signal power that is needed to receive the data. A detailed description of the UI image according to the present general inventive concept will be set forth below.

The user inputting unit 70 receives information related to the noise level of at least one of the receiving unit 10 and the state of the power supplied to the system unit 20. The user inputting unit 70 according to an embodiment of the present general inventive concept may be provided at a side of a main body of the signal receiving apparatus 1. If the user inputting unit 70 is embodied by a remote controller, it may include a menu key which is provided at the remote controller and a key signal generating unit which generates a key signal in response to a key operation.

The controlling unit 80 compares the noise level which is generated if the power is supplied to the system unit 20 with the signal power level of the received data, thus determining whether the data can be received. Then, the controlling unit 80 indicates through the indicating unit 50 whether the data can be received. The controlling unit 80 according to an embodiment of the present general inventive concept can be embodied by a microcomputer and software.

Hereinafter, a detailed operation of the controlling unit 80 is described with reference to FIGS. 1A-3B, where the Digital Multimedia Broadcasting (DMB) signal is an embodiment of the data.

If the power of the signal receiving apparatus 1 is off, the controlling unit 80 supplies the power to the certain module including the receiving unit 10 so that the controlling unit 80 can estimate the signal power level of the data. If the DMB signal needs to be received, the controlling unit 80 controls the receiving unit 10 to perform tuning of the receiving unit 10 to a selected frequency band. The controlling unit 80 controls the system unit 20 so that the signal tuned from the receiving unit 10 can be transformed into a digital signal of which the baseband 120 can be processed by the ADC 105. The controlling unit 80 controls the baseband 120 of the system unit 20 so that demodulating, channel decoding, etc., to transform the received data into a stream can be performed.

The controlling unit 80 may estimate a bit error rate (BER) of the received data during the channel decoding. The controlling unit 80 AV-decodes the transformed stream and outputs an image through a displaying unit such as an LCD, etc.

The noise is generated in a process that the power is supplied to the system unit 20 and the system unit 20 is operated, and the receiving unit 10 cannot properly receive the data, if the signal power level of the received data is less than the sum of the noise level and C/N ratio.

In an embodiment of the present general inventive concept, the system unit 20 may also include a CPU 160, a graphic generator 165, an LCD 150, a flash memory 170, a DRAM 175, a hard disk drive (HDD) 180, a sound generator 155 and a peripheral 185.

Figure 2:
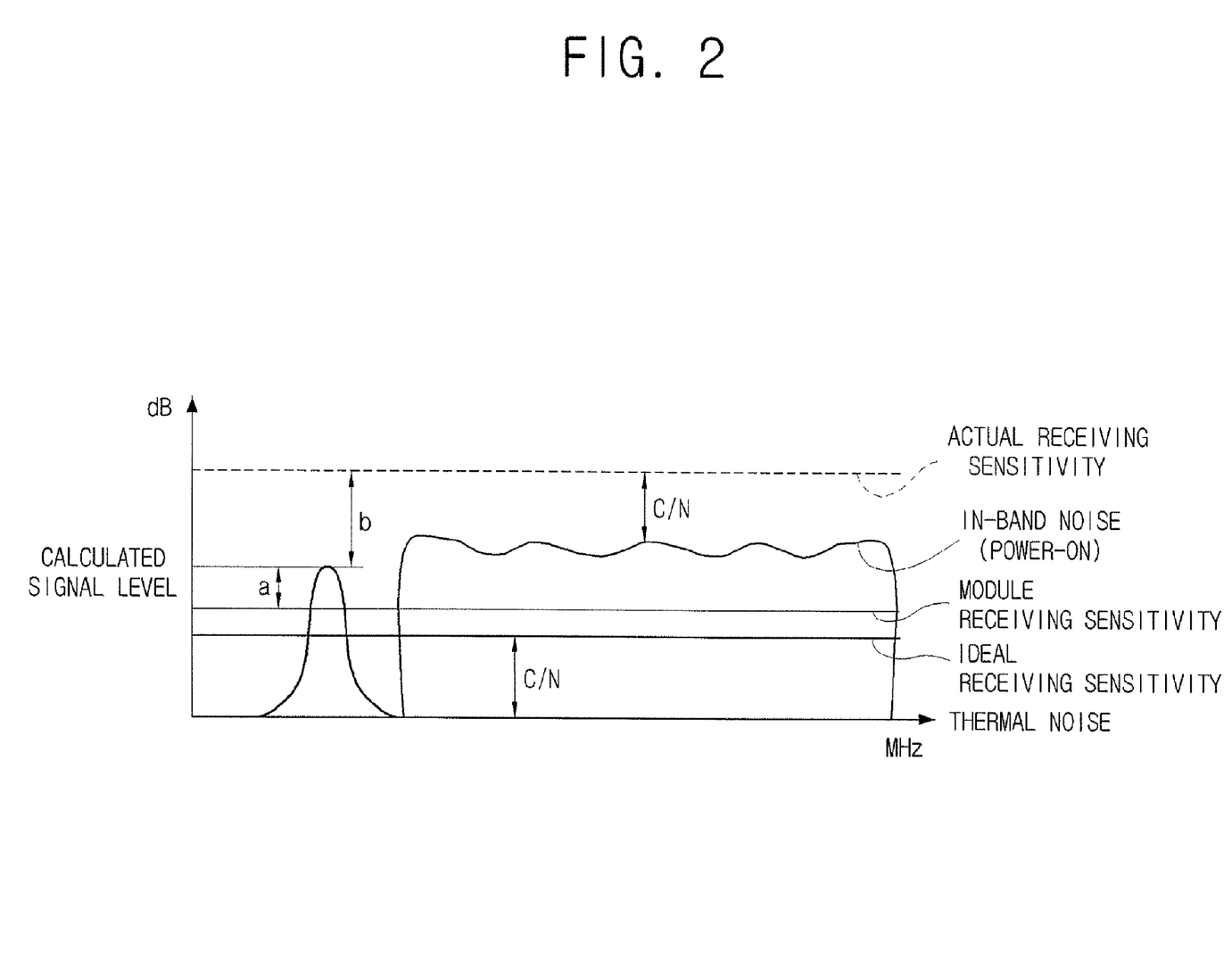
FIG. 2 is a graph illustrating levels of receiving sensitivity of a signal receiving apparatus and noise according to an embodiment of the present general inventive concept.

FIG. 2 is a graph illustrating levels of receiving sensitivity of a signal receiving apparatus and noise. Referring to FIGS. 1A, 1B and 2, a receiving sensitivity which the receiving unit 10 can ideally receive is the sum of a thermal noise and a carrier to noise (C/N) ratio. The thermal noise is a noise which is always present at normal temperature. The C/N ratio, which may be varied according to a decoding algorithm of each channel, may be a difference ratio of a minimum signal level to normally receive the data signal in relation to the noise level.

The controlling unit 80 determines that the power is on if the system unit 20 is supplied with the power, and extracts information related to a noise level from the storing unit 30. As illustrated in FIG. 2, although the signal power level of the data received from the receiving unit 10 is higher by "a" than a signal power level corresponding to the receiving sensitivity of the receiving unit 10, the data cannot be actually received due to the noise which is generated if the power is on, that is in-band noise. Also, the level where the data can be received is a level which is the sum of the in-band noise level and the C/N ratio. Therefore, the signal power level of the received data is less by "b" than the actual receiving sensitivity.

The controlling unit 80 indicates the determination about whether the data can be received through the indicating unit 40, thus informing the user about whether the data can actually be received due to the noise which is generated according to the power supplied to the system unit 20.

Figure 3A:
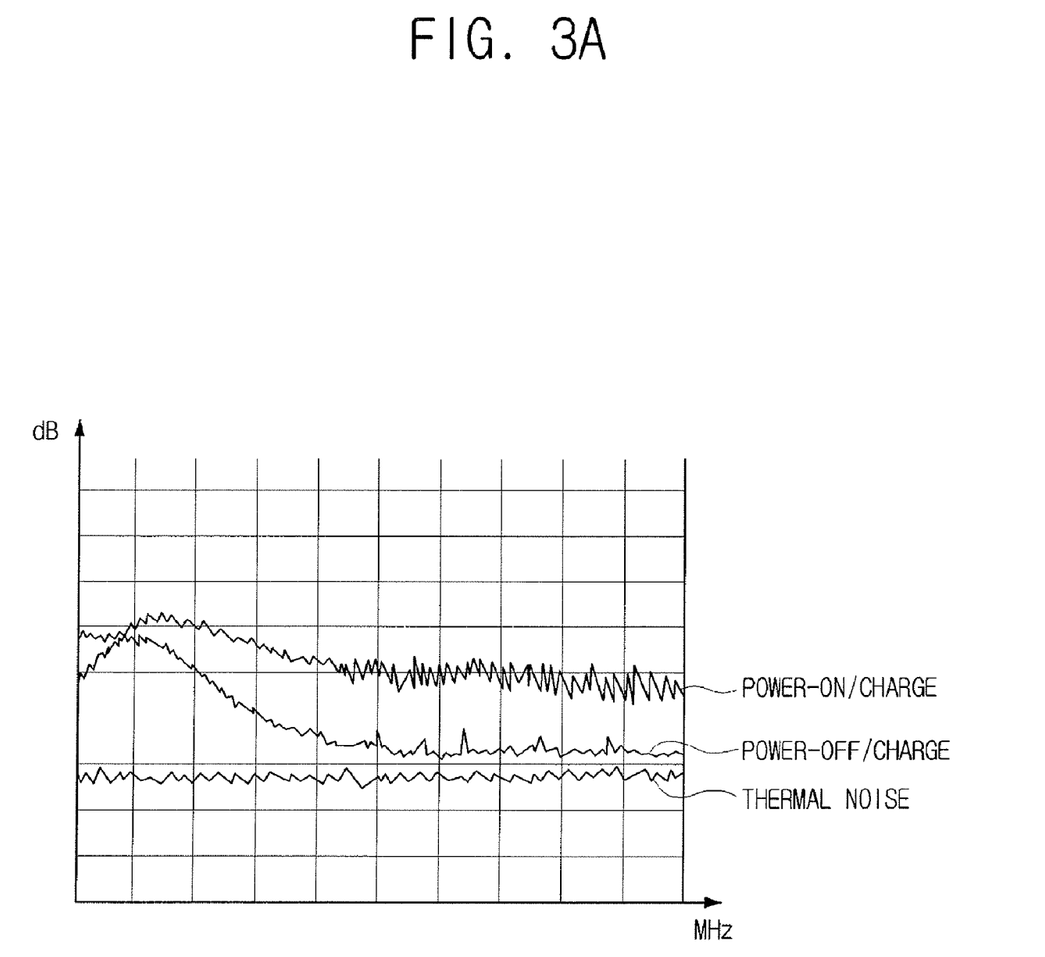
FIG. 3A and FIG. 3B are graphs illustrating noise level according to operating states of the signal receiving apparatus according to an embodiment of the present general inventive concept.
Figure 3B:
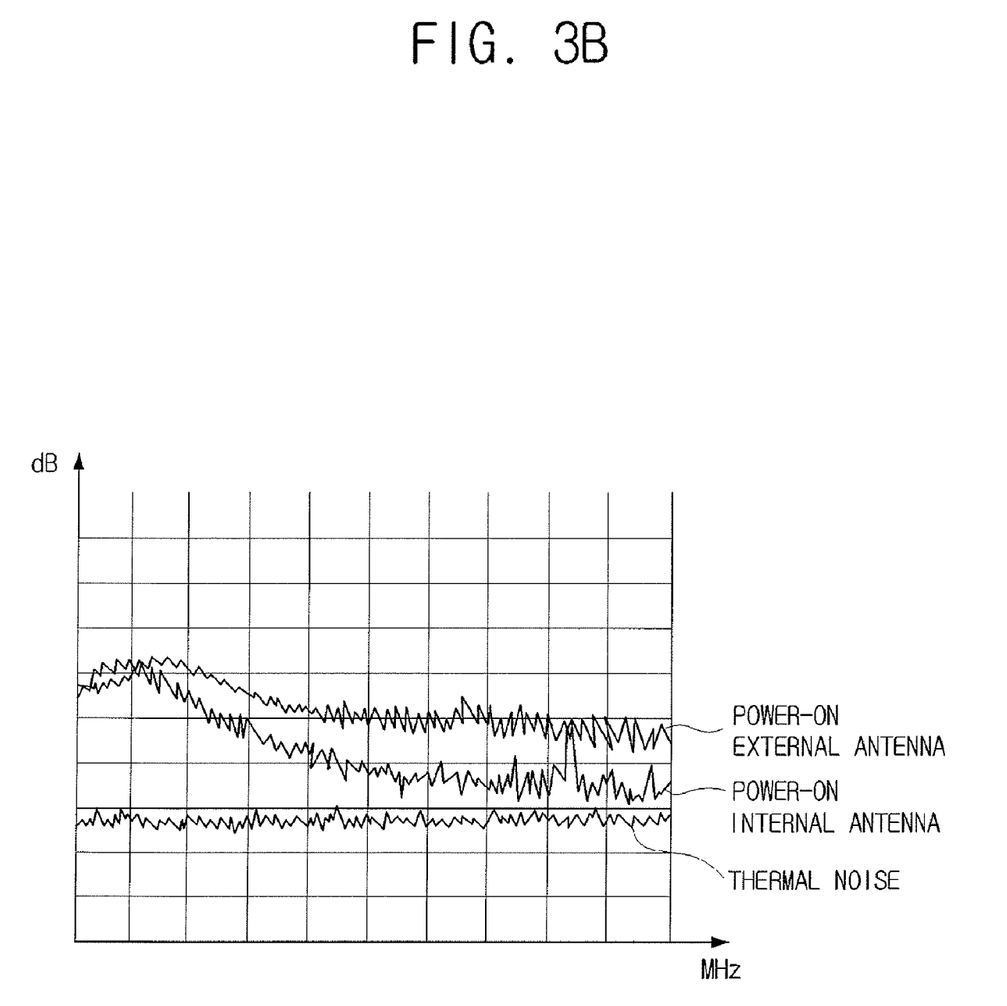

FIG. 3A and FIG. 3B are graphs illustrating noise level according to operating states of the signal receiving apparatus 1.

Referring to FIGS. 1A, 1B, 3A and 3B, the signal receiving apparatus 1 has a different noise level according to the frequency band and the operating state of the system unit 20. Therefore, whether the data can be received may be correctly determined by storing the noise level according to the operation of the system unit 20 by using equipment such as a spectrum analyzer (SA).

Table 1 illustrates numerical values of the noise level according to the receiving unit 10, the state of the power supplied to the system unit 20, etc. Table 2 illustrates relations between the signal power level of the data and the noise level according to the operation mode of the system unit 20.

TABLE 1

| Operating state of system unit | | | Noise level per frequency level | | | | | |
|---|---|---|---|---|---|---|---|---|
| Power | Antenna | Battery | 8A | 8B | 8C | 12A | 12B | 12C |
| On | Internal antenna | Charge | −83 | −80 | −81 | −88 | −86 | −86 |
| | | Discharge | −88 | −85 | −85 | −93 | −91 | −92 |
| | | Buffer | −90 | −88 | −87 | −97 | −96 | −97 |
| | External antenna | Charge | −88 | −86 | −86 | −92 | −91 | −91 |
| | | Discharge | −93 | −90 | −90 | −98 | −95 | −96 |
| | | Buffer | −95 | −92 | −93 | −101 | −100 | −102 |

TABLE 2

| Operating state of system unit | | | Noise level per frequency channel where, ( ) is an actual receiving sensitivity added by C/N value, if C/N = 10 dB | | | | | |
|---|---|---|---|---|---|---|---|---|
| Power | Antenna | Battery | 8A | 8B | 8C | 12A | 12B | 12C |
| On | Internal | Discharge | −88 (−78) | −85 (−75) | −85 (−75) | −103 (−93) | −101 (−91) | −102 (−92) |

TABLE 2-continued

| Operating state of system unit | | | Noise level per frequency channel where, ( ) is an actual receiving sensitivity added by C/N value, if C/N = 10 dB | | | | | |
| --- | --- | --- | --- | --- | --- | --- | --- | --- |
| Power | Antenna | Battery | 8A | 8B | 8C | 12A | 12B | 12C |
| Calculated signal level | | | −83 | −85 | −84 | −84 | −85 | −85 |
| Compensated receiving allowable level | | | −5 | −10 | −9 | +9 | +6 | +7 |

As illustrated in Table 1, for example, if the operating mode of the system unit 20 is divided according to the states of the power, the antenna and the battery, the noise level varies according to the operating state of the system unit 20 and the frequency channel. Accordingly, the noise where the internal antenna is used is generally greater than that where the external antenna is used. Also, the noise where the battery is being charged is mostly greater than that where the battery is being discharged or completely charged.

Table 2 illustrates a process to calculate the receiving allowable level according to the noise level caused by the operating mode and the signal power level of the received data. The controlling unit 80 calculates the actual receiving sensitivity, which reflects the C/N ratio, from the noise level stored in the storing unit 30, and calculates the difference between the calculated receiving sensitivity and the power level of the signal of the received data. Therefore, if the receiving allowable level of a compensated data has a positive value, that is, if the signal power level of the data is higher than the receiving sensitivity, the controlling unit 80 indicates through the indicating unit 50 that the data can be received.

Likewise, if the receiving allowable level of a compensated data has a negative value, that is, if the signal power level of the data is lower than the receiving sensitivity, the controlling unit 80 indicates through the indicating unit 50 that the data cannot be received.

Considering that even a difference of 2 to 3 dB in the terrestrial DMB can determine whether the data can be received, as illustrated in FIG. 2, the difference between the receiving allowable levels 8B and 12A is 19 dB, so that wrong information about whether the data can be received may be provided.

Hereinafter, the UI through which the signal receiving apparatus 1 according to an embodiment of the present general inventive concept indicates whether the data can be received is described with reference to FIG. 4.

Figure 4:
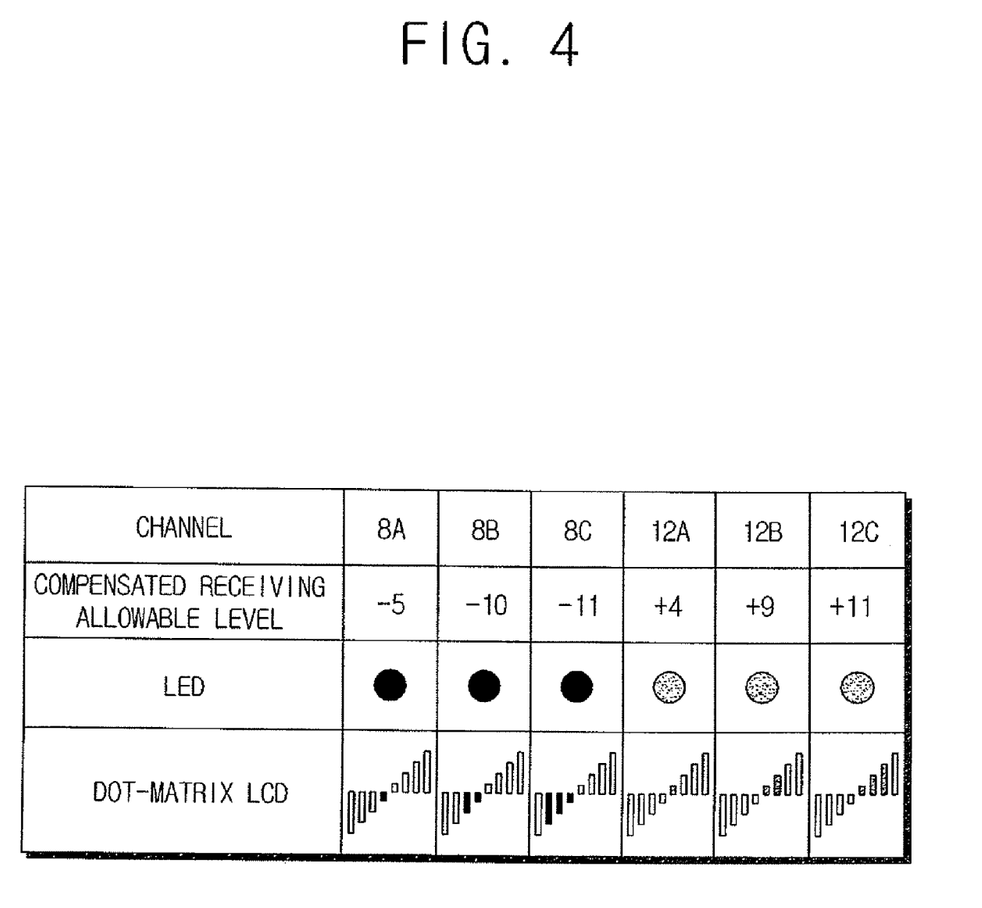
FIG. 4 is an example of an indication of a level where the data can be received in the signal receiving apparatus according to an embodiment of the present general inventive concept.

Referring to FIGS. 1A, 1B and 4, if the indicating unit 50 provided in the signal receiving apparatus 1 is embodied by an LED, the controlling unit 80 may control the indicating unit 50 to display lights of which colors are different therebetween according to whether the receiving allowing level of the compensated data has the negative value or the positive value, thus informing the user whether the data at present can be received.

Also, if the indicating unit 50 provided in the signal receiving apparatus 1 is embodied by a dot-matrix LCD, the controlling unit 80 can indicate the signal power level step by step according to the receiving allowable level of the compensated data. Accordingly, even if the data is not received, the signal level of the power which is required to receive the data can also be informed to the user.

Alternatively, referring to FIG. 1B, if one of the operating modes of the system unit 20 is inputted by the user input unit 70, the controlling unit 70 may control the UI generating unit 60 to generate the UI which indicates whether the data can be received according to the inputted operating mode irrespective of the current operating mode. Accordingly, the user may easily change the operating mode into one that is required to receive the data.

Therefore, the user may be correctly informed whether the signal receiving apparatus 1 can be used at the present location.

Hereinafter, the signal power prediction method of the signal receiving apparatus 1 according to the present general inventive concept is described with reference to FIG. 5.

Figure 5:
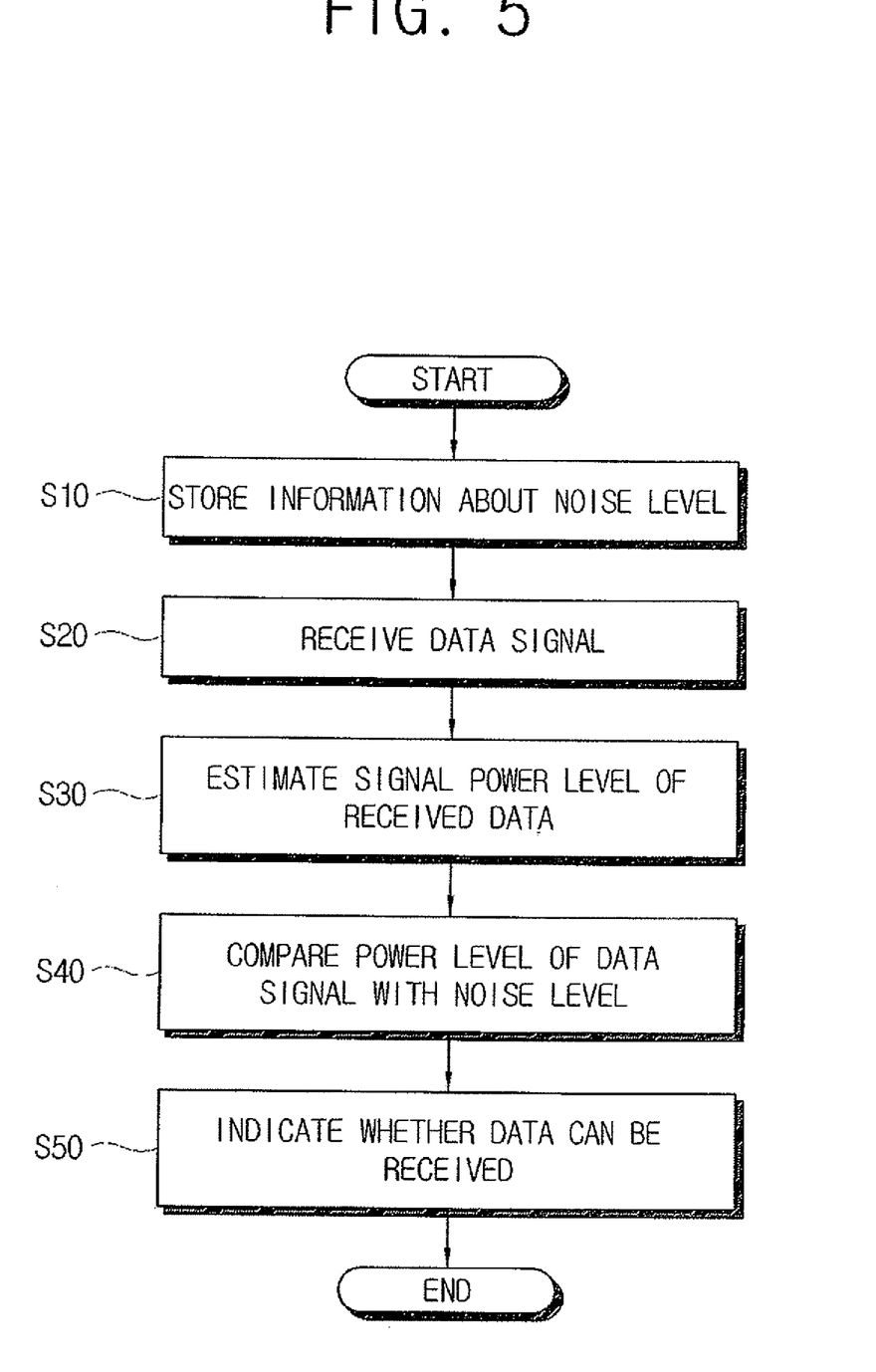
FIG. 5 is a flow diagram illustrating a signal power prediction method according to an embodiment of the present general inventive concept

Referring to FIGS. 1A, 1B and 5, the controlling unit 80 stores the information related to the noise level which is generated by the power supplying unit 40 to the system unit 20 at operation S10. The controlling unit 80, for example, may store the information about the sum of the noise level and the C/N value. Then, the controlling unit 80 receives the data from outside through the receiving unit 10 at operation S20, and estimates the signal power level of the received data at operation S30.

The controlling unit 80 compares the power level of the received data with the noise level stored in the storing unit 30 at operation S40. Then, at operation S50, the controlling unit 80 indicates through the indicating unit 50 whether the data can be received according to a result of comparing at operation S40. That is, if the signal power level of the received data is higher than the value where the C/N value is reflected in the noise level stored at the storing unit 30, the controlling unit 80 indicates through the indicating unit 50 that the data can be received. Also, if the signal power level of the received data is lower than the value where the C/N value is reflected in the noise level stored at the storing unit 30, the controlling unit 80 indicates through the indicating unit 50 that the data cannot be received. If the stored information is not about the noise level but about the sum of the noise level and the C/N value, the signal power level of the received data is directly compared with the stored value.

However, if the data cannot be received at operation S50, the controlling unit 80 may indicate through the indicating unit 50 the power level that is required to receive the data.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to various embodiments of the signal receiving apparatus and the signal power prediction method, the information about the noise level, which is generated if the power is supplied to the signal receiving apparatus, is stored and compared with the power level of the received data signal, so that correct information about whether the data can be received can be provided to the user.

Also, even if the data cannot be received, the signal receiving apparatus may indicate the signal power level that is required to receive the data, enabling the user to easily use the signal receiving apparatus.

Although a few exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A signal receiving apparatus, comprising:
    an indicating unit to indicate whether data can be received;
    a receiving unit to receive data;
    a system unit which comprises a plurality of electronic components to provide signal processing;
    a storing unit to store information related to a noise level; and
    a controlling unit to estimate a signal power level of the data received by the receiving unit, to calculate an actual receiving sensitivity of the data from the information related to the noise level stored in the storing unit by reflecting a carrier to noise level, to compare the estimated signal power level of the data with the calculated receiving sensitivity, and to control the indicating unit to indicate whether the data can be received based on the compared result,
    wherein the information related to a noise level comprises information where the noise level per frequency varies according to at least one of a state of power supplied to the system unit, a current state of a battery, and a type of antenna included in the receiving unit.

2. The signal receiving apparatus according to claim 1, further comprising:
    a user interface (UI) generating unit to generate a UI image indicating whether the data can be received,
    wherein the controlling unit controls the UI image to indicate whether the data can be received.

3. The signal receiving apparatus according to claim 2, wherein if the data cannot be received, the controlling unit controls the UI generating unit to generate the UI image which indicates the signal power level required to receive the data.

4. The signal receiving apparatus according to claim 1, further comprising:
    a user inputting unit, wherein the controlling unit receives a selection of the information related to the noise level through the user inputting unit, and indicates whether the data can be received according to the selected information.

5. The signal receiving apparatus according to claim 1, wherein the received data is a digital multimedia broadcasting (DMB) signal.

6. A signal power prediction method of a signal receiving apparatus comprising a system unit which includes a plurality of electronic components to provide signal processing, the signal power prediction method comprising:
    storing information related to a noise level which is generated by a power supply to the system unit;
    receiving data from an outside;
    estimating a signal power level of the received data by calculating an actual receiving sensitivity of the data from the stored information related to the noise level by reflecting a carrier-to-noise level;
    comparing the estimated signal power level of the data with the calculated receiving sensitivity; and
    determining and indicating whether the data can be received according to a result of the comparing operation,
    wherein the information related to the noise level comprises information where the noise level per frequency varies according to at least one of a state of power supplied to the system unit, a current state of a battery, and a type of antenna included in the receiving unit.

7. The method according to claim 6, wherein the information related to the noise level corresponds to at least one of a noise generated within a receiving unit which receives the data and a noise generated when power is supplied to the system unit.

8. The method according to claim 6, wherein the indicating whether the data can be received comprises indicating a signal power level required to receive the data if the data cannot be received.

9. The method according to claim 6, wherein the received data comprises a digital multimedia broadcasting (DMB) signal.

10. A method of operating a signal receiving apparatus, the method comprising:
    identifying a signal power level of data;
    determining whether the power signal level is lower than a receiving sensitivity of a signal receiving apparatus by comparing an estimated signal power level based on information related to a noise level of the signal carrying the data with the receiving sensitivity of the signal receiving apparatus, the receiving sensitivity calculated by reflecting a carrier-to-noise signal ratio of the signal carrying the data; and
    indicating that the data cannot be received by the signal receiving apparatus if the determining operation determines that the signal power level is lower than the receiving sensitivity,
    wherein the information related to the noise level comprises information where the noise level per frequency varies according to at least one of a state of power supplied to the signal receiving apparatus, a current state of a battery, and a type of antenna included in the signal receiving apparatus.

11. The method according to claim 10, wherein the signal receiving level is predetermined.

* * * * *